United States Patent
Botimer et al.

(10) Patent No.: US 12,353,846 B2
(45) Date of Patent: Jul. 8, 2025

(54) MATRIX DATA REUSE TECHNIQUES IN MULTIPLY AND ACCUMULATE UNITS OF PROCESSING SYSTEM

(71) Applicant: MemryX Inc., Ann Arbor, MI (US)

(72) Inventors: Jacob Botimer, Ann Arbor, MI (US); Mohammed Zidan, Ann Arbor, MI (US); Chester Liu, Ann Arbor, MI (US); Fan-hsuan Meng, Ann Arbor, MI (US); Timothy Wesley, Ann Arbor, MI (US); Wei Lu, Ann Arbor, MI (US); Zhengya Zhang, Ann Arbor, MI (US)

(73) Assignee: MemryX, Ann Arbor, MI (US)

( * ) Notice: Subject to any disclaimer, the term of this patent is extended or adjusted under 35 U.S.C. 154(b) by 143 days.

(21) Appl. No.: 16/731,035

(22) Filed: Dec. 31, 2019

(65) Prior Publication Data

US 2021/0011732 A1 Jan. 14, 2021

Related U.S. Application Data

(60) Provisional application No. 62/872,147, filed on Jul. 9, 2019.

(51) Int. Cl.
| | |
|---|---|
| *G06F 9/38* | (2018.01) |
| *G06F 7/544* | (2006.01) |
| *G06F 9/30* | (2018.01) |
| *G06F 9/54* | (2006.01) |
| *G06F 12/02* | (2006.01) |
| *G06F 13/16* | (2006.01) |
| *G06F 17/16* | (2006.01) |
| *G06V 10/44* | (2022.01) |
| *G06V 10/94* | (2022.01) |

(52) U.S. Cl.
CPC ........ *G06F 7/5443* (2013.01); *G06F 9/30032* (2013.01); *G06F 9/3824* (2013.01); *G06F 9/3893* (2013.01); *G06F 9/544* (2013.01); *G06F 12/0246* (2013.01); *G06F 13/1668* (2013.01); *G06F 17/16* (2013.01); *G06V 10/451* (2022.01); *G06V 10/955* (2022.01); *G06F 2212/7207* (2013.01)

(58) Field of Classification Search
CPC ....... G06F 9/3824; G06F 9/3893; G06F 17/16
See application file for complete search history.

(56) References Cited

U.S. PATENT DOCUMENTS

| 8,867,289 B2 | 10/2014 | Wu et al. |
| 2003/0065984 A1 | 4/2003 | Takeda et al. |

(Continued)

FOREIGN PATENT DOCUMENTS

CN 106250103 12/2016

*Primary Examiner* — Jacob Petranek

(57) ABSTRACT

Techniques for computing matrix convolutions in a plurality of multiply and accumulate units including data reuse of adjacent values. The data reuse can include reading a current value of the first matrix in from memory for concurrent use by the plurality of multiply and accumulate units. The data reuse can also include reading a current value of the second matrix in from memory to a serial shift buffer coupled to the plurality of multiply and accumulate units. The data reuse can also include reading a current value of the second matrix in from memory for concurrent use by the plurality of multiply and accumulate units.

15 Claims, 13 Drawing Sheets

(56) References Cited

U.S. PATENT DOCUMENTS

| | | |
|---|---|---|
| 2006/0119384 A1 | 6/2006 | Camarota et al. |
| 2010/0174848 A1 | 7/2010 | Hana et al. |
| 2011/0153707 A1* | 6/2011 | Ginzburg ............ G06F 9/30036 |
| | | 708/523 |
| 2014/0115224 A1* | 4/2014 | Sanghai .............. G06F 13/4022 |
| | | 710/317 |
| 2017/0357894 A1 | 12/2017 | Bainville et al. |
| 2018/0107921 A1 | 4/2018 | Ross et al. |
| 2018/0129893 A1 | 5/2018 | Son et al. |
| 2019/0026078 A1 | 1/2019 | Bannon et al. |
| 2019/0171448 A1* | 6/2019 | Chen ..................... G06F 9/3867 |
| 2019/0311243 A1* | 10/2019 | Whatmough .......... G06N 3/063 |
| 2019/0340486 A1* | 11/2019 | Mills ..................... G06F 7/5443 |
| 2020/0117450 A1* | 4/2020 | Mansell .............. G06F 9/30076 |
| 2020/0265107 A1* | 8/2020 | Narayanamoorthy .. G06F 17/16 |

\* cited by examiner

MATRIX DATA REUSE TECHNIQUES IN MULTIPLY AND ACCUMULATE UNITS OF PROCESSING SYSTEM

CROSS-REFERENCE TO RELATED APPLICATIONS

This application claims the benefit of US Provisional Patent Application No. 62/872,147 filed Jul. 9, 2019, which is incorporated herein in its entirety.

BACKGROUND OF THE INVENTION

The computation of convolutions in computing system is utilized extensively in artificial intelligence tasks such as image processing, and the like. Generally, a convolution is the process of adding a weighting of each element in a matrix to its local neighbors. Referring to FIG. 1, an exemplary convolution of a weights matrix 110 with an input feature map matrix 120 according to the convention art is shown. The convolution of the weight matrix 110 with the input feature map 120 generates an output feature map matrix 130. The parameters of the weights matrix 110, the input feature map matrix 120 and the output feature map 130 are set forth in Table 1.

TABLE 1

|  | Dimension | Description |
| --- | --- | --- |
| Weights | R | Kernel Height |
|  | S | Kernel Width |
|  | C | Input Channels |
|  | M | Filters (Output Channels) |
| Input Feature Map | W | Input Feature Map Width |
|  | H | Input Feature Map Height |
|  | C | Input Channels |
| Output Feature Map | F | Output Feature Map Width |
|  | E | Output Feature Map Height |
|  | M | Output Channels |

A special case where a convolution is characterized by R=H, S=W is commonly known as a fully connected layer. Although a general convolution case described herein is used to described embodiments of the present technology, the same techniques can be equally applied to the special case of a fully connected layer.

In a computing system, the convolution can be computed using a multiply and accumulate (MAC) unit. Referring now to FIG. 2, an exemplary computing system according to the conventional art is shown. The compute system 200 can include one or more memories 210 communicatively coupled to one or more processors 220 by one or more communication interfaces 230. One or more multiply and accumulate units 240 of one or more processors 220 can be configured to perform a multiply and accumulate function on a weight matrix 110 and an input feature map matrix 120 to generate an output feature map matrix 130. The weight matrix 110, input feature map matrix 120 and output feature map matrix 130 can be stored in the one or more memories. The computation of a convolution is further described with reference to FIGS. 3, 4A and 4B. FIG. 3 shows a method of computing a convolution according to the conventional art. FIGS. 4A and 4B illustrate exemplary multiply and accumulate operations used in the computation of the convolution according to the conventional art.

The computation of the convolution can begin with loading a current weight value (0,0,0) and a current input feature map value (0,0,0) from memory 210 into a multiply and accumulation unit 240 of a processor 220 during a first cycle (T=0), at 310. At 320, a multiply and accumulate operation can be performed using the current weight value and the current input feature map value to generate a corresponding current accumulated value. For example, the multiply and accumulate unit 210 can accumulate the product of the current weight value (0,0,0) and the current input feature map value (0,0,0) during the first cycle (T=0). At 330, the operations at 310 and 320 can be iterated through corresponding input channels of the input feature map and corresponding input channels of the weights. At 340, the operations at 310-330 can be iterated through kernel height and kernel width of the weights, and corresponding map width and map height of the input feature map. For example, at a second cycle (T=1), a second weight value (0,0,1) and a second input feature map value (0,0,1) can be loaded from memory into the multiply and accumulate unit 240. The product 410 of the current weight value and the current input feature map value can be added 420 to the accumulated value from the first cycle and held in the accumulator 430.

At 350, the current accumulated value from the multiply and accumulate unit can be output as a corresponding output feature map value. For example, at cycle R×C×S the accumulated value of the multiply and accumulate unit 240 can be output as a corresponding output feature map value (1,1,0) in a first output channel of the output feature map. At 360, the current accumulated value in the multiply and accumulate unit 240 can be reset, and the operations at 310-350 can be iterated through map width and map height of the input feature map and corresponding kernel height and kernel width of the weights. For example, after computing output feature map values corresponding to the input feature map values in the compute window of (0,0,0) and (3,3,C-1) for the input feature map as illustrated in FIG. 4A, the output feature map values corresponding to the input feature map values in the compute window of (0,1,0) and (3,4,C-1) for the input feature map can be computed as illustrated in FIG. 4B, and continue accordingly. At 370, the operations at 310-360 can be iterated through filters of the weights.

Each multiply and accumulate operation in computing the convolution involves loading a current weight value and a current input feature map value in from one or more memories, performing the computations thereon, loading the corresponding generated output feature map value out to memory, and throwing away data after each computation of an output feature map value.

Artificial Intelligence tasks and the like can require the computation of a large number of convolutions. The loading of corresponding weight values and a corresponding input feature map values for calculating each corresponding output feature map value can consume a substantially amount of communication bandwidth between the one or more memories and the one or more processors, and or can consume a substantial amount of power to read the data from memory, transfer the data across the communication link, and write the resulting data back to memory. Accordingly, there is a continuing need for improved convolution computation techniques for use in processing systems.

SUMMARY OF THE INVENTION

The present technology may best be understood by referring to the following description and accompanying drawings that are used to illustrate embodiments of the present technology directed toward matrix data reuse techniques in processing systems.

In one embodiment, a computing system can include one or more memories and one or more processors. The one or more memories can be configured to store a first matrix and a second matrix. In one implementation, the first matrix can be a weight matrix and the second matrix can be an input feature map of image pixel values. The one or more processors can be configured to perform a convolution of the first matrix and the second matrix to generate a third matrix using a plurality of multiply and accumulate units with data reuse of adjacent values in one or both of the first matrix and second matrix by respective ones of the plurality of multiply and accumulate units.

In another embodiment, a method of computing a convolution of a weight matrix and an input feature map can include loading values of the weight matrix and values of the input feature map in from one or more memory devices. Multiply and accumulate operations can be performed in parallel in a plurality of multiply and accumulation units on corresponding values of the weight matrix and values of the input feature map. Adjacent values in the weight matrix and or the input feature map can be reused by respective ones of the plurality of multiply and accumulate units to generate an output feature map. In one implementation, current values of the weight matrix can be loaded in from the memory to the plurality of multiply and accumulate units. In another implementation, values of the input feature map can be loaded in from the one or more memories to a serial shift buffer. A plurality of values in the input feature map are input from corresponding shift elements of the serial shift buffer to corresponding ones of the plurality of multiply and accumulate units, and the current values of the weight matrix can be loaded in from the memory to the plurality of multiply and accumulate units. In yet another implementation, a current value of the input feature map can be loaded in from the memory to the plurality of multiply and accumulate units. In an optional implementation, the output from the plurality of multiply and accumulate units can also be pooled before writing back to the one or more memory devices.

The embodiments of the present technology advantageously reduce duplicate memory access for computation of convolutions. Instead, memory access can be shared between a plurality of multiply and accumulate units used for computing the convolutions. Optionally, the data values can also be buffered in the processors for repeated use by the plurality of multiply and accumulate units. The reuse of input data can advantageously reduce bottlenecks on the communication channels between memory and the processors. The reuse of input data can also advantageously reduce power consumed by reducing the amount of access to memory for computation of the convolutions by the multiply and accumulate units of the processors. Communication channel utilization and or power consumption can also be reduced by performing pooling operations at the output of the plurality of multiply and accumulate units before writing the pooled data back to memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
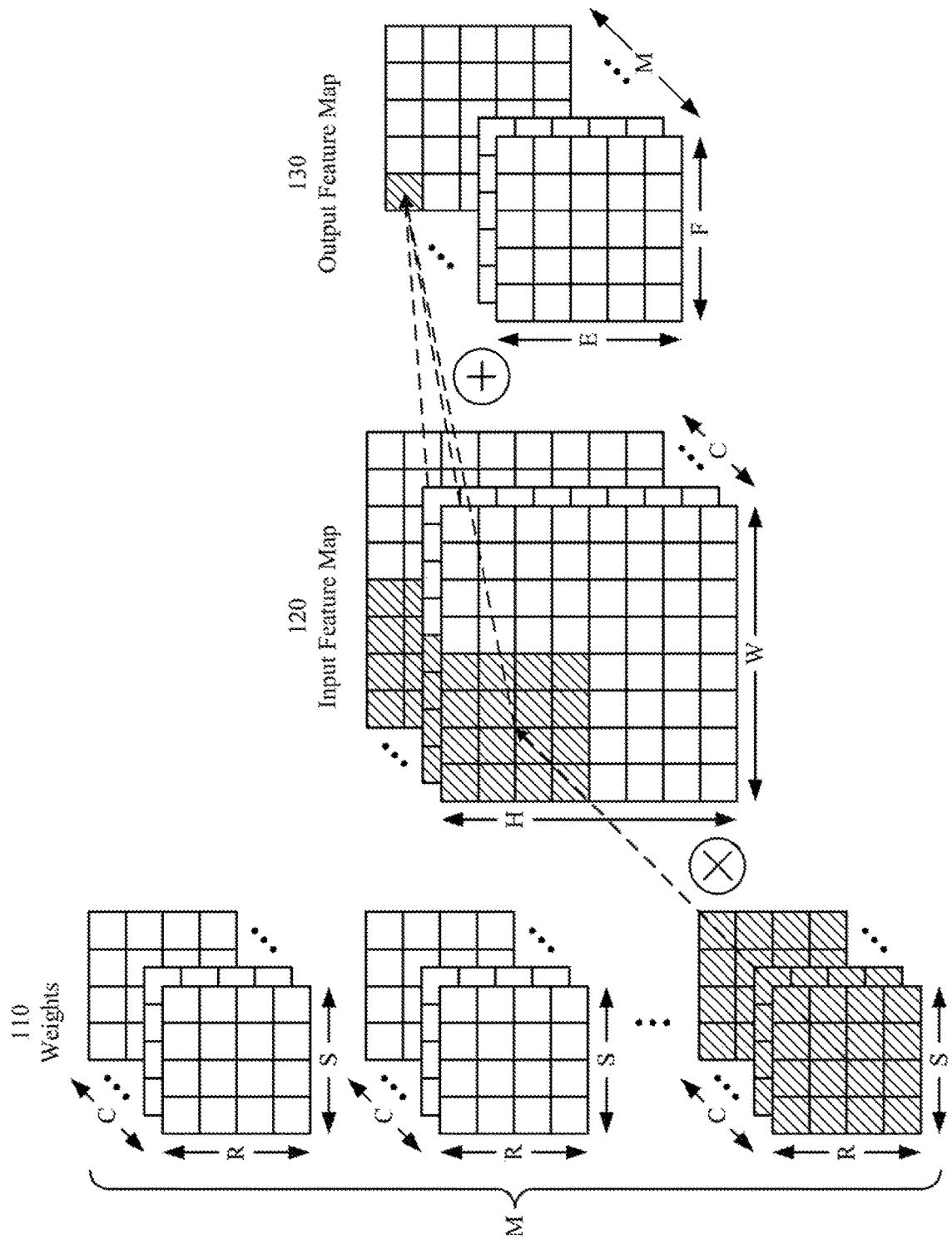
FIG. 1 show's an exemplary convolution of a weights matrix with an input feature map matrix according to the conventional art.
Figure 2:
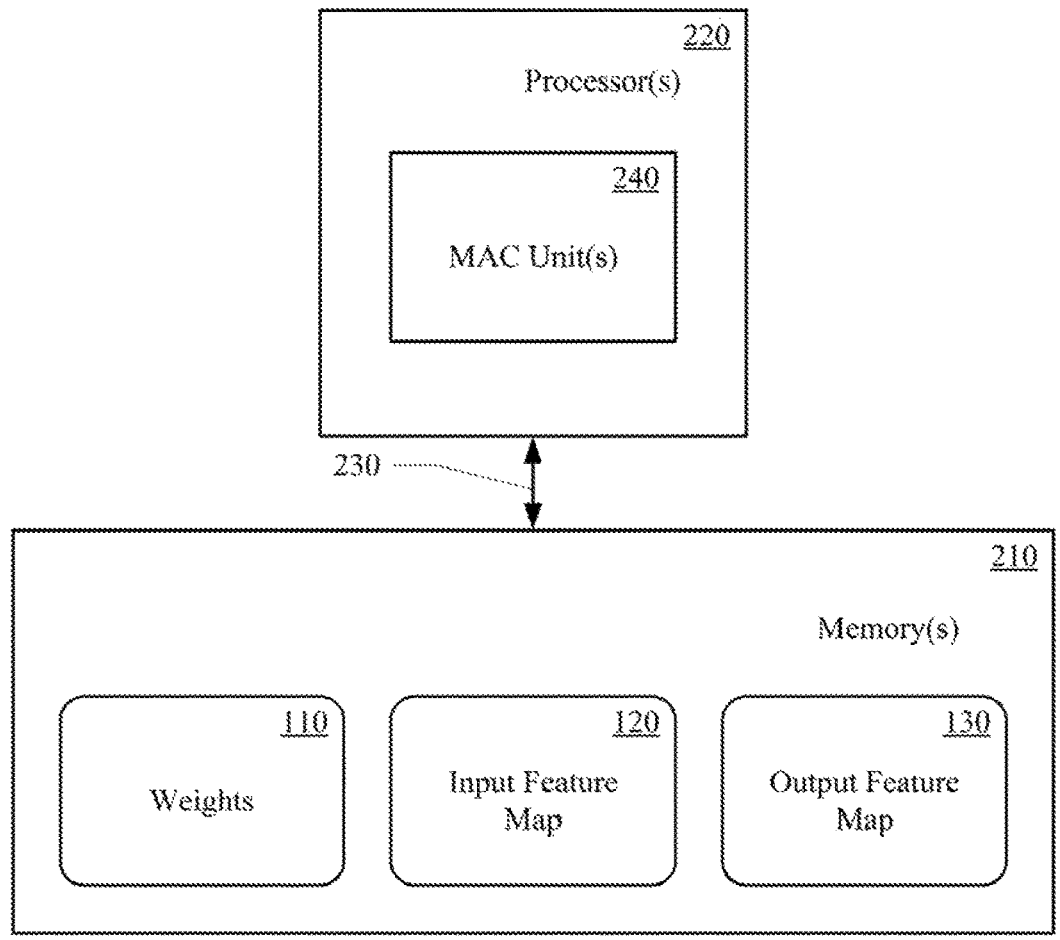
FIG. 2 shows an exemplary computing system according to the conventional art.
Figure 3:
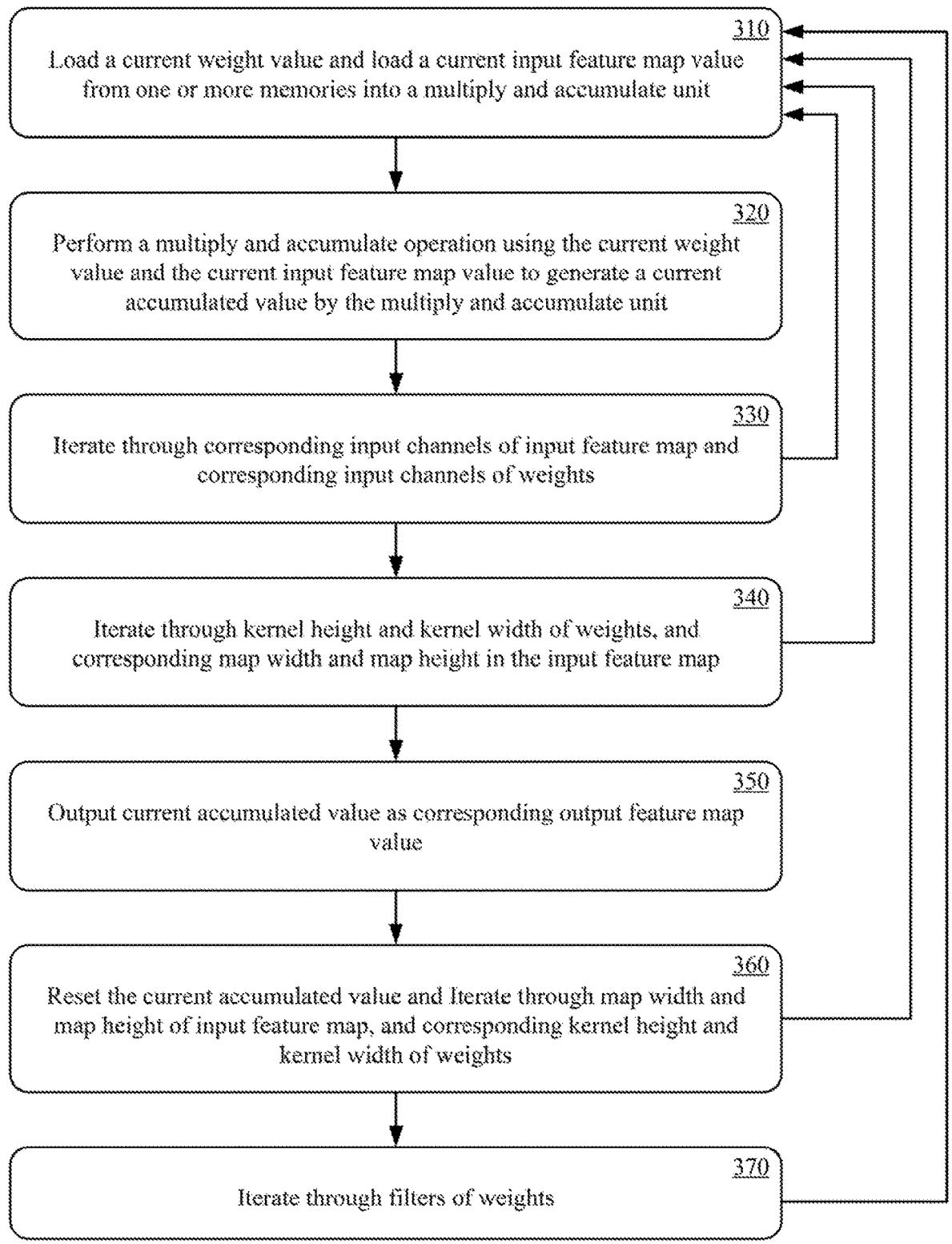
FIG. 3 shows a method of computing a convolution according to the conventional art.
Figure 4A:
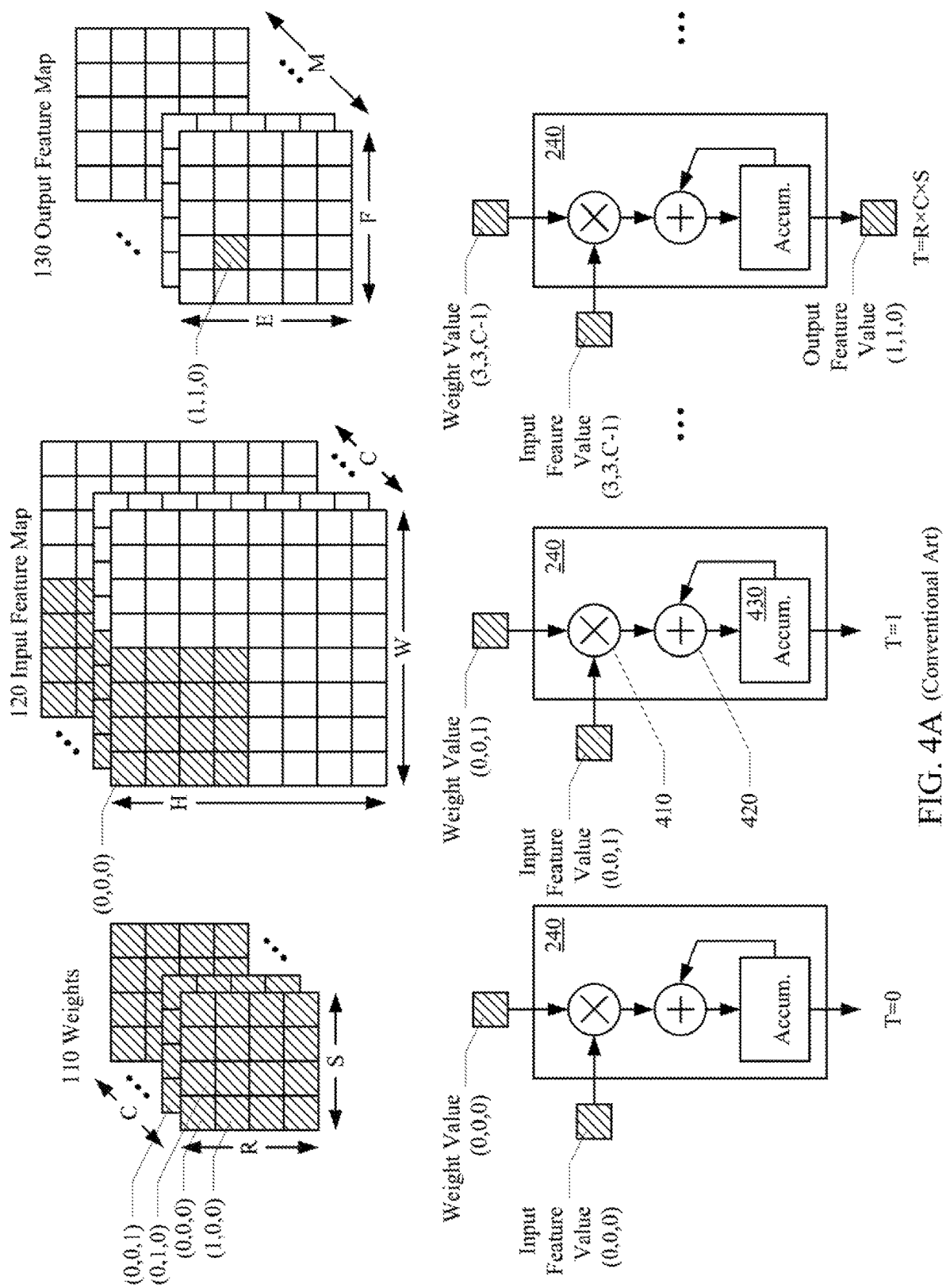
FIGS. 4A and 4B illustrate exemplary multiply and accumulate operations used in the computation of the convolution according to the conventional art.
Figure 4B:
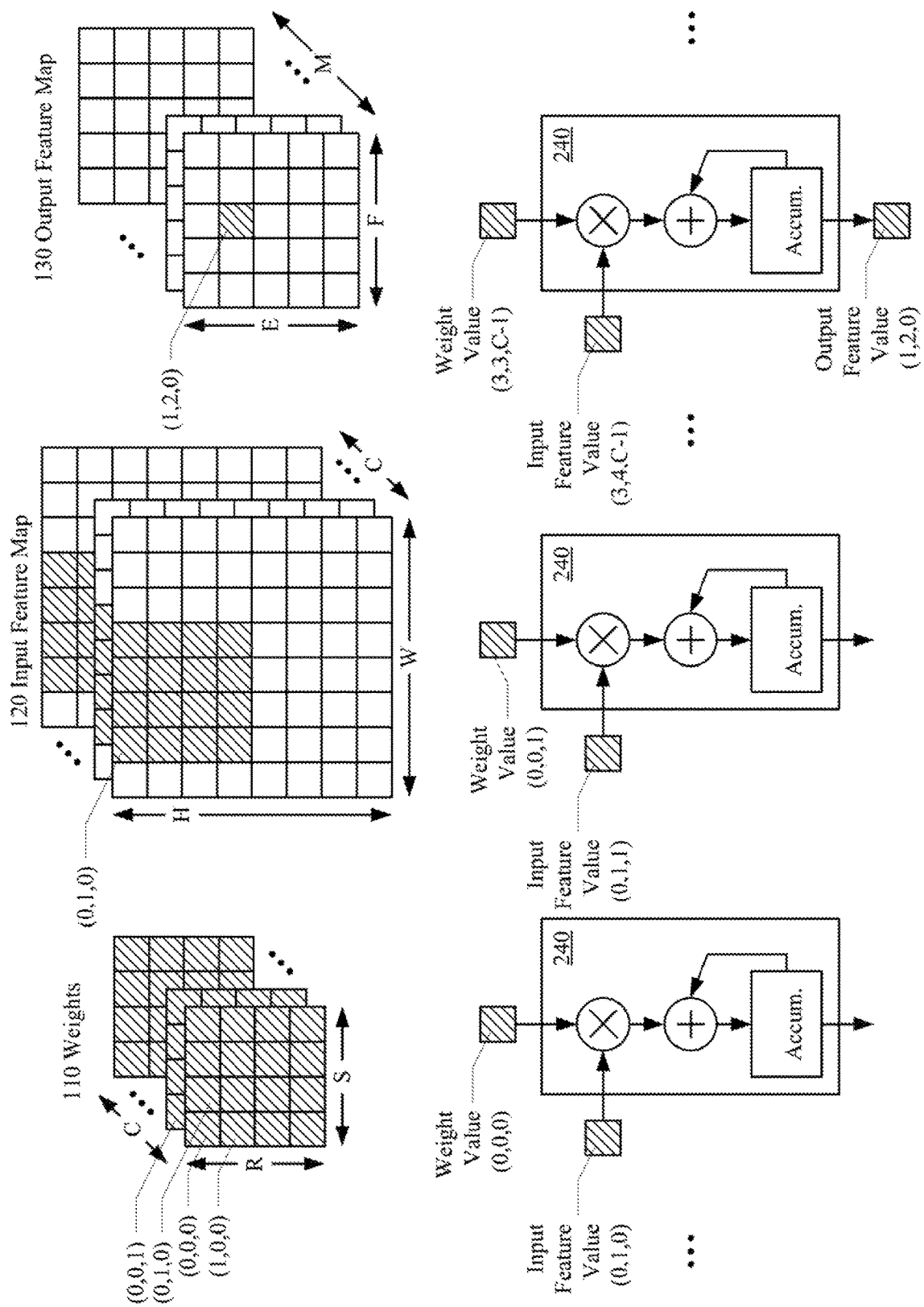

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the present or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Figure 5:
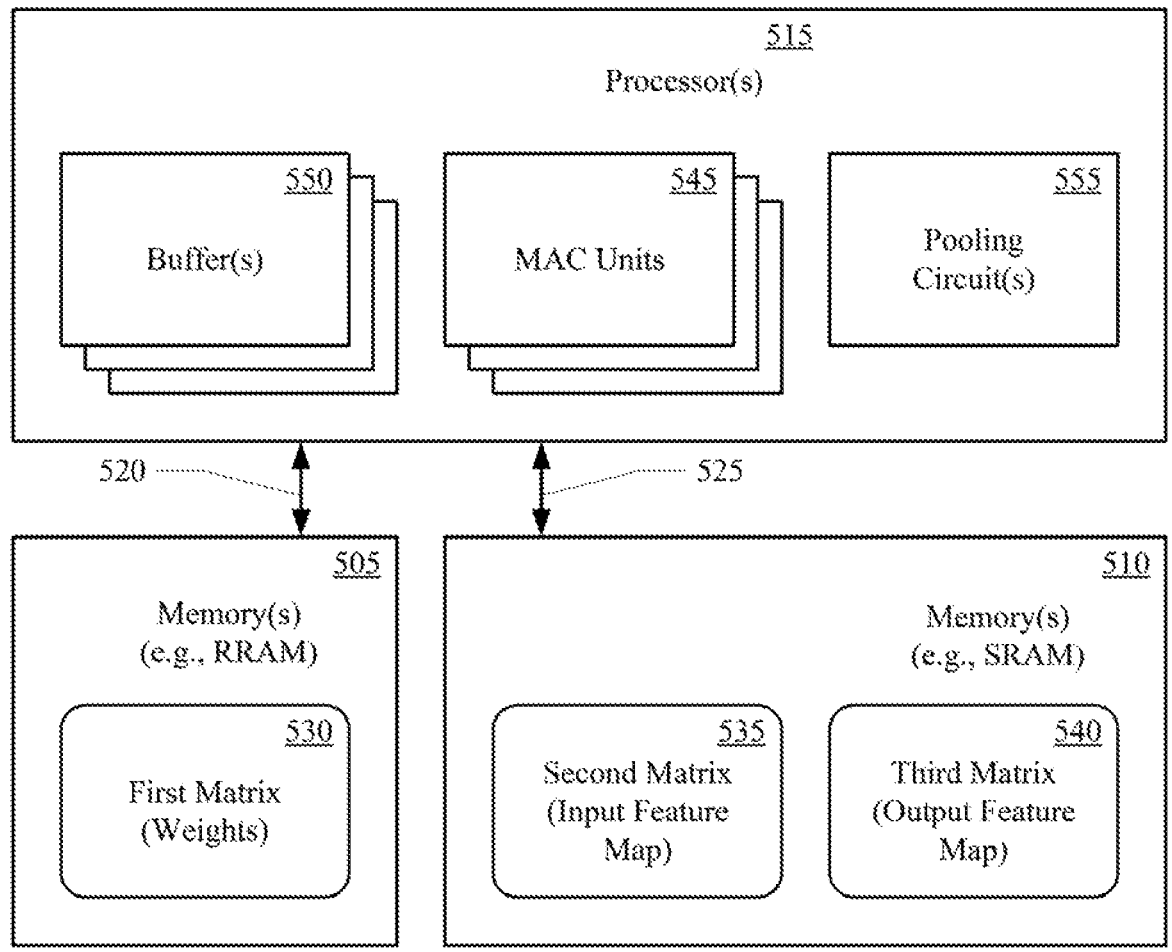
FIG. 5 shows a system for computing matrix convolutions, in accordance with aspects of the present technology.

Referring now to FIG. 5, a system for computing matrix convolutions, in accordance with aspects of the present technology, is shown. The system 500 can include one or more memories 505,510 coupled to one or more processors 515 by one or more communication interfaces 520,525. The one or more memories 505,510 can be configured to store a first matrix (e.g., a weight matrix) 530, a second matrix (e.g., an input matrix) 535, and a third matrix (e.g., an output matrix) 540. The one or more processors 515 can be one or more central processing units (CPUs), one or more cores of one or more central processing units (CPUs), one or more graphics processing units (GPUs), one or more cores of one or more graphics processing units (GPUs), one or more neural processing units (NPUs), one or more cores of one or more neural processing units (NPUs), one or more vector processors, one or more memory processing units, or the like, or combinations thereof. The one or more processors can include a plurality of multiply and accumulate (MAC) units 545, optionally a plurality of buffers 550, and optionally one or more pooling circuits 555. The multiply and accumulate units 545 can be implemented in hardware of the one or more processors 515, or can be implemented as functions by software executing on the one or more processors 515. The one or more processors 515 can be configured to perform a convolution of the first matrix 530 and the second matrix 535 to generate the third matrix 540. The one or more processors 515 can compute the convolution with data reuse of values in the first matrix 530, the second matrix 535 or both by respective ones of the plurality of multiply and accumulate units 545 for computing adjacent values in the third matrix 540. In one implementation, the data reuse can include reading a current value of the first matrix 530 in from memory 505 for concurrent use by two or more multiply and accumulate units 545. In another implementation, the data reuse can include a serial shift buffer 550 including a plurality of subsets of buffer elements, wherein respective subsets of the buffer elements are coupled to respective multiply and accumulate units 545. The current value of the second matrix 535 can be read in from memory 510 and shifted through the serial shift buffer 550. In yet another implementation, the data reuse can include reading a current value of the second matrix 535 in from memory 510 for concurrent use by two or more multiply and accumulate units 545. Other implementations can include various combinations of the data reuse implementations described herein. In the various possible implementations, input data of adjacent matrix values read in from memory can be shared among two or more multiply and accumulate units so that computations can be done in parallel for each access to memory. The input data of adjacent matrix values can also be buffered for repeated use by the two or more multiply and accumulate units.

Figure 6:
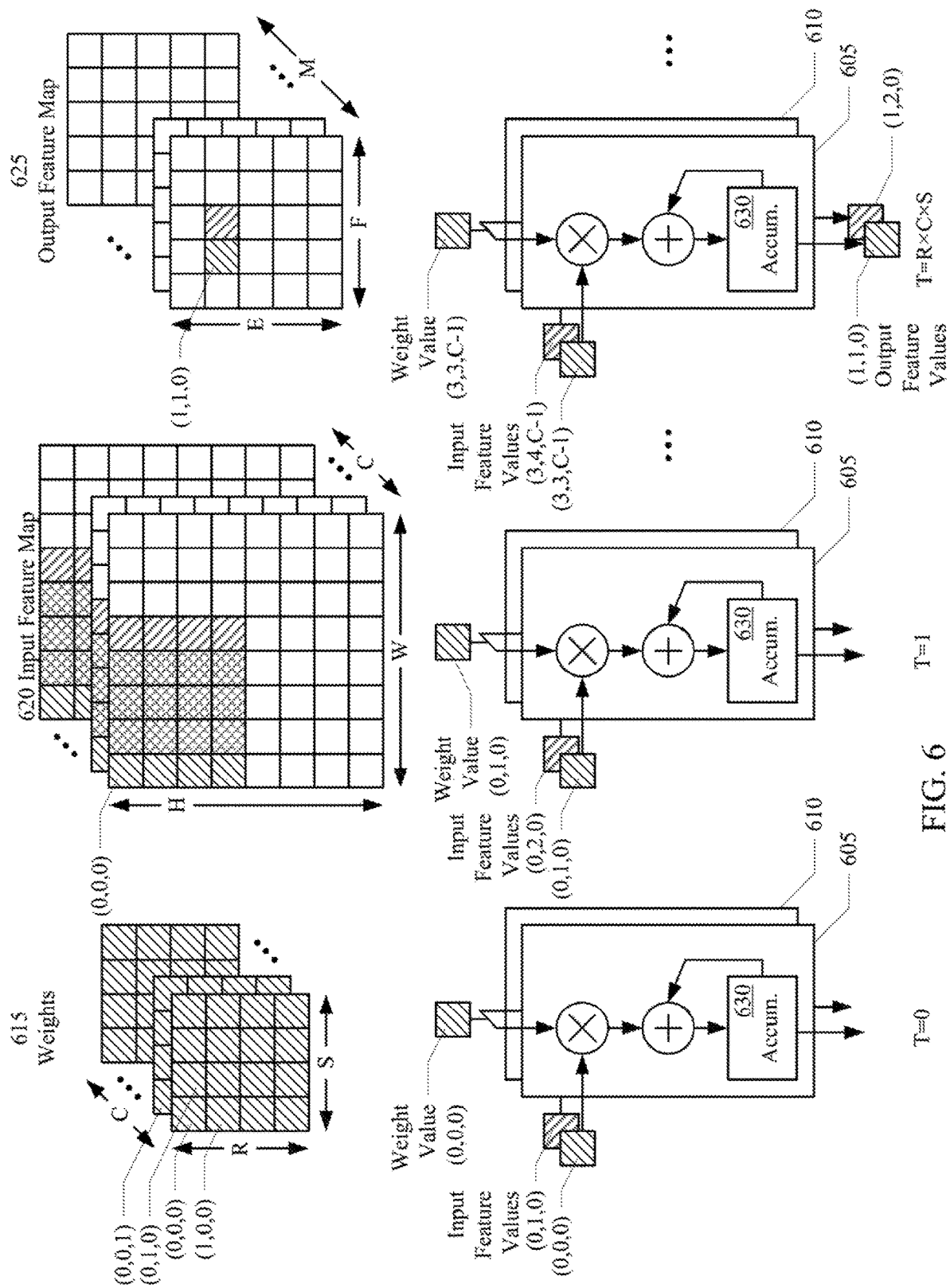
FIG. 6 illustrates exemplary multiply and accumulate operations used in the computation of the convolution, in accordance with aspects of the present technology.
Figure 7:
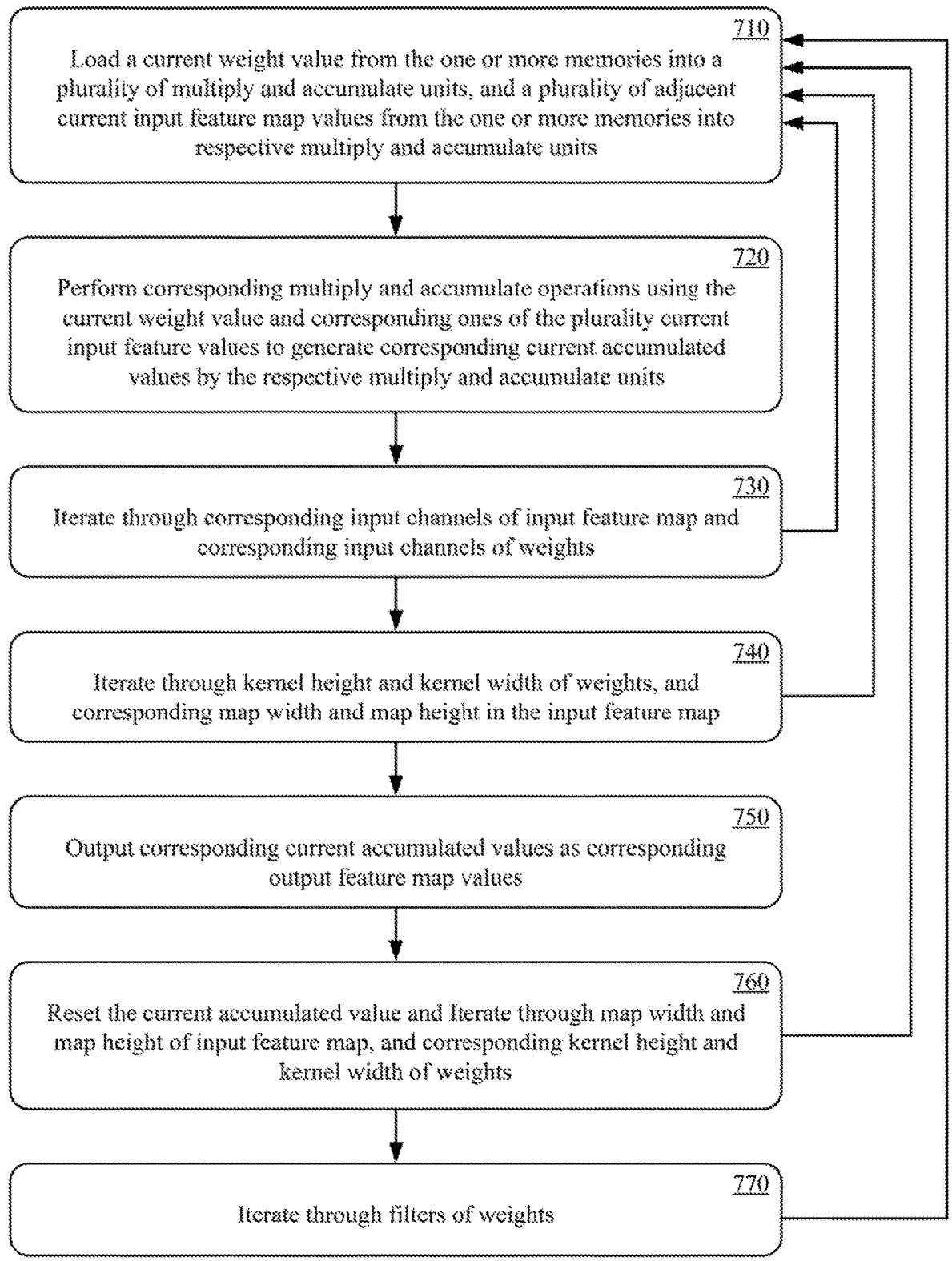
FIG. 7 shows a method of computing a convolution, in accordance with aspects of the present technology.

Referring now to FIGS. 6 and 7, the data reuse including reading a current value of the first matrix in from memory to the plurality of multiply and accumulate units, in accordance with aspects of the present technology, is shown. As illustrated in FIG. 6, the processor can include a plurality of multiply and accumulate units 605, 610. To compute the convolution of a first matrix (e.g., weights) and a second matrix (e.g., input feature map), every output value (e.g., output feature map) in an output channel requires access to all the values of the first matrix in one filter. Accordingly, the plurality of multiply and accumulate units 605, 610 can be configured to receive a current data value of a first matrix read in from a memory. The plurality of multiply and accumulate units 605, 610 can also be configured to receive respective ones of a plurality of adjacent values from a second matrix. In one implementation, the first matrix can be a weight matrix 615 and the second matrix can be an input feature map 620, as previously described with reference to FIG. 1. The input feature map 620 can for example comprise a plurality of image pixel values. The third matrix generated by the convolution of the weight matrix 615 and the input feature map 620 can be an output feature map 625. Each multiply and accumulate unit 605, 610 can multiply data values of the weight matrix 615 with the corresponding adjacent data values in the input feature map 620 and sum the product with the content of the respective accumulator buffers 630 in the multiply and accumulate units 605, 610 to generate a current data value in the output feature map 625.

Operation of the plurality of multiply and accumulate units 605, 610 will be further described with reference to FIG. 7. The operation can begin with loading a current weight value (0,0,0) and a plurality of adjacent input feature map values (0,0,0) and (0,1,0) from memory into respective multiply and accumulate units 605, 610, at 710. For example, the weight value (0,0,0) can be loaded from a first memory such as static random access memory (SRAM), resistive random access memory (RRAM), magnetic random access memory (MRAM), phase change random access memory (PCRAM), or flash memory into both multiply and accumulate units 605, 610, and the plurality of adjacent input feature map values (0,0,0) and (0,1,0) can be loaded from a second memory such as SRAM, RRAM, MRAM, PCRAM or flash memory into respective ones of the multiply and accumulate units 605, 610, during a first cycle (T=0).

Although FIG. 6 illustrates two multiply and accumulate units 605, 610, aspects of the present technology can be extended to more multiply and accumulate units. For example, if a compute window is a four by four set of elements, up to sixteen multiply and accumulate units can be configured to receive the current weight value and up to sixteen adjacent respective current input feature map values. If the compute window is a six by six set of elements, up to thirty-six multiply and accumulate units can be configured to receive the current weight value and up to thirty-six adjacent respective current input feature map values.

At 720, corresponding multiply and accumulate operations can be performed using the current weight value and respective ones of the plurality of current input feature values to generate corresponding current accumulated values by the respective multiply and accumulate units 605, 610 during the first cycle (T=0). Therefore, during the first cycle (T=0), the current weight value is reused in the plurality of multiply and accumulate units 605, 610. For example, a first multiply and accumulate unit 605 can accumulate the product of the weight value (0,0,0) and the input feature map value (0,0,0), and the second multiply and accumulate unit 610 can accumulate the product of the weight value (0,0,0) and the adjacent input feature map value (0,1,0) during the first cycle. The weight value (0,0,0) is loaded once from memory and used by the first multiply and accumulate unit 605, and also "reused" by the second multiply and accumulate unit 610 without the need to reload the value from memory.

At 730, the operations at 710 and 720 can be iterated through corresponding input channels of the input feature map and corresponding input channels of the weights. At 740, the operations at 710-730 can be iterated through the kernel height and kernel width of the weights, and the corresponding map width and map height in the input feature map. For example, at a second cycle (T=1), a second weight value (0,1,0) can be loaded from memory and third and fourth input feature map values (0,1,0) and (0,2,0) can be loaded from the memory. The product of the current weight value and the current respective input feature map values can be added to the accumulated value from the first cycle.

After iterating through the kernel height and kernel width of the weights and corresponding map width and map height in the input feature map, the corresponding current accumulated values from the respective multiply and accumulate units 605, 610 can be output as corresponding output feature map values, at 750. For example, at cycle R×C×S, the accumulated value of the first multiply and accumulate unit 605 can be output as a corresponding output feature map value (1,1,0), and the accumulated value in the second multiply and accumulate unit 610 can be output as a corresponding output feature map value (1,2,0) in a first output channel of the output feature map.

At 760, the current accumulated values in the respective multiply and accumulate units 605, 610 can be reset, and the operations at 710-750 can be iterated through the map width and map height of the input feature map and the corresponding kernel height and kernel width of the weights. At 770, the operations at 710-760 can be iterated through the filters of the weights to generate the complete output feature map 625.

Figure 8:
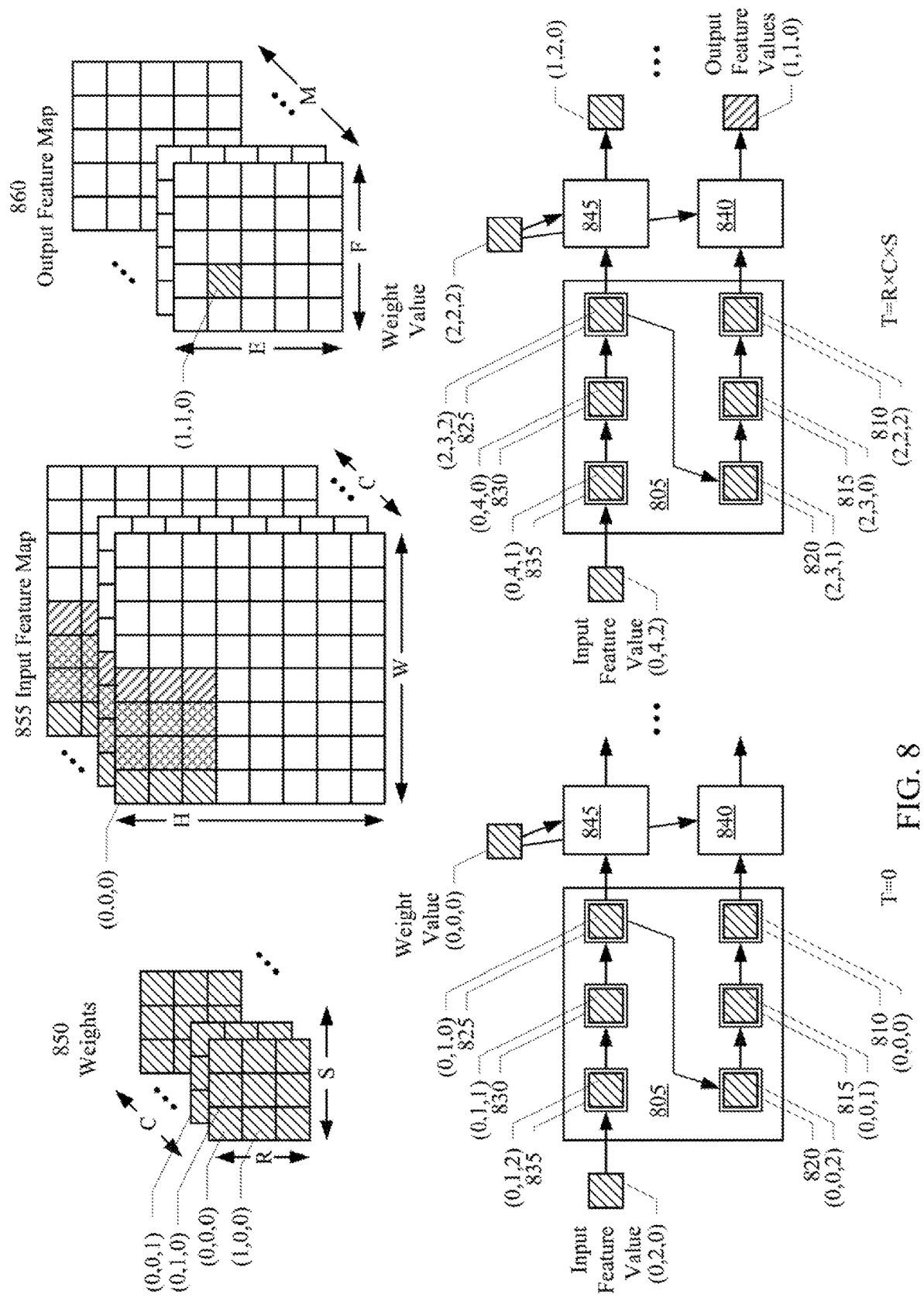
FIG. 8 shows exemplary multiply and accumulate operations used in the computation of the convolution, in accordance with aspects of the present technology.
Figure 9:
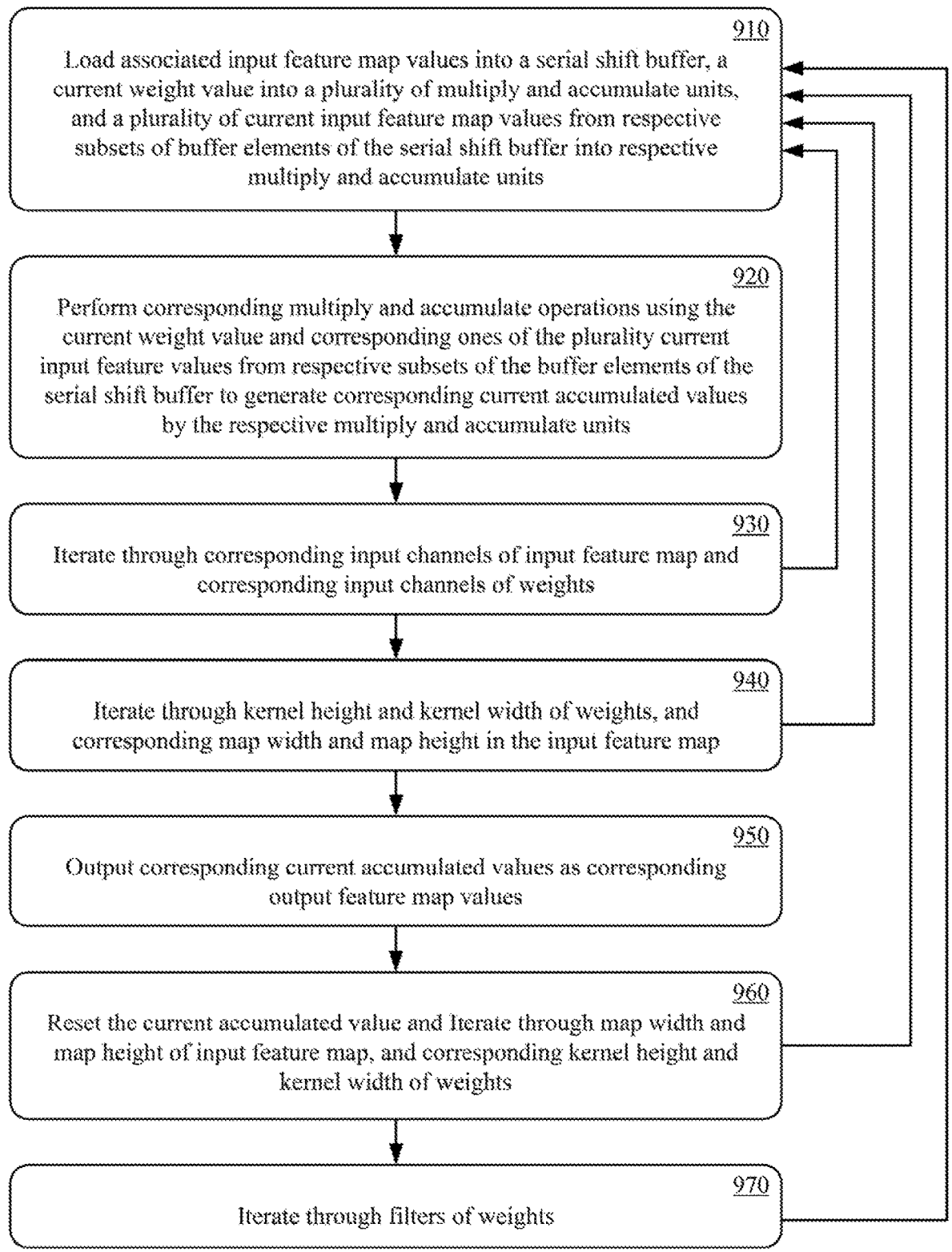
FIG. 9 shows a method of computing a convolution, in accordance with aspects of the present technology.

Referring now to FIGS. 8 and 9, the data reuse including reading a current value of the second matrix in from memory to a serial shift buffer coupled to a plurality of multiply and accumulate units, in accordance with aspects of the present technology, is shown. To compute the convolution of a first matrix (e.g., weights) and second matrix (e.g., input feature map), every output matrix value (e.g., output feature map) across output channels requires access to the same window of values in the second matrix. The scanning windows typically overlap, requiring values from the second matrix to be reloaded for adjacent output values. As illustrated in FIG. 8, a serial shift buffer 805 can include a plurality of subsets of buffer elements 810-820, 825-835. The plurality of multiply and accumulate units 840, 845 can be configured to receive a current data value of a first matrix read in from memory. The serial shift buffer 805 can be configured to receive a corresponding data value of a second matrix read in from a memory. The data values of the second matrix read in from memory can be successively shifted through the buffer elements 810-835 of the serial shift buffer 805. A respective subset of buffer elements 810-820, 825-835 can be coupled to a respective multiply and accumulate unit 840, 845. For example, a first subset of buffer elements 810-820 can be coupled to a first multiply and accumulate unit 840, and a second subset of buffer elements 825-835 can be coupled to a second multiply and accumulate unit 845. In one implementation, the first matrix can be a weight matrix 850 and the second matrix can be an input feature map 855, as previously described with reference to FIG. 1. In such case, the third matrix generated by the convolution of the weight matrix 850 and the input feature map 855 can be an output feature map 860. Each multiply and accumulate unit 840, 845 can multiply the current data value in the weight matrix 850 with the respective adjacent data value in the input feature map from the respective subset of buffer elements 810-820, 825-835 and sum the product with the content of the accumulator buffer to generate a current data value in the output feature map 860.

Operation of the plurality of multiply and accumulate units will be further described with reference to FIG. 9. The operation can begin with loading one or more associated input feature map values into the serial shift buffer 805, loading a current weight value into the plurality of multiply and accumulate units 840, 845, and loading a plurality of current input feature map values from respective subsets of buffers elements of the serial shift buffer 805 into respective multiply and accumulate units 840, 845, at 910. For example, the serial shift buffer 805 can be initialized by shifting in a plurality of input feature map values (0,0,0) through (0,1,2) from memory. Thereafter, a current weight value (0,0,0) can be loaded from memory into the plurality of multiply and accumulate units 840, 845, a first current input feature map value (0,0,0) can be loaded from a first subset of buffer elements 810-820 into a first multiply and accumulate unit 840, and a second current input feature map value (0,1,0) can be loaded from a second subset of buffer elements 825-835 into a second multiply and accumulate unit 845. Although FIG. 8 illustrates two multiply and accumulate units 840, 845, aspects of the present technology can be extended to more multiply and accumulate units along with a serial shift buffer 805 including more subsets of buffer elements. Likewise, the number of buffer elements in each subset can be more or less than the three illustrated. Generally, the number of multiply and accumulate units and the number of buffer elements in each subset of the serial shift buffer can be based on the parameters of the weights matrix.

At 920, corresponding multiply and accumulate operations can be performed using the current weight value and respective ones of the plurality of current input feature values to generate corresponding current accumulated values by the respective multiply and accumulate units 840, 845 during the first cycle (T=0). Therefore, during the first cycle (T=0), the current weight value is reused in the plurality of multiply and accumulate units 840, 845. For example, a first multiply and accumulate unit 840 can accumulate the product of the weight value (0,0,0) and the input feature map value (0,0,0), and the second multiply and accumulate unit 845 can accumulate the product of the weight value (0,0,0) and the adjacent input feature map value (0,1,0) during the first cycle. The weight value (0,0,0) is loaded once from memory and used by the first multiply and accumulate unit 840, and also "reused" by the second multiply and accumulate unit 845 without the need to reload the value from memory. In addition, the input feature map values will also be reused as they are shifted through the serial shift buffer 805.

At 930, the operations at 910 and 920 can be iterated through corresponding input channels of the input feature map and corresponding input channels of the weights. At 940, the operations at 910-930 can be iterated through the kernel height and kernel width of the weights, and the corresponding map width and map height in the input feature map. For example, at a second cycle (T=1), a second weight value (0,0,1) can be loaded from memory and third and fourth input feature map values (0,0,1) and (0,1,1) can be loaded from the memory. The product of the current weight value and the current respective input feature map values can be added to the accumulated value from the first cycle.

After iterating through the kernel height and kernel width of the weights and corresponding map width and map height in the input feature map, the corresponding current accumulated values from the respective multiply and accumulate units 840, 845 can be output as corresponding output feature map values, at 950. For example, at cycle R×C×S, the accumulated value of the first multiply and accumulate unit 840 can be output as a corresponding output feature map value (1,1,0), and the accumulated value in the second multiply and accumulate unit 845 can be output as a corresponding output feature map value (1,2,0) in a first output channel of the output feature map.

At 960, the current accumulated values in the respective multiply and accumulate units 840, 845 can be reset, and the operations at 910-950 can be iterated through the map width and map height of the input feature map and the corresponding kernel height and kernel width of the weights. At 970, the operations at 910-960 can be iterated through the filters of the weights to generate the complete output feature map 860.

Figure 10:
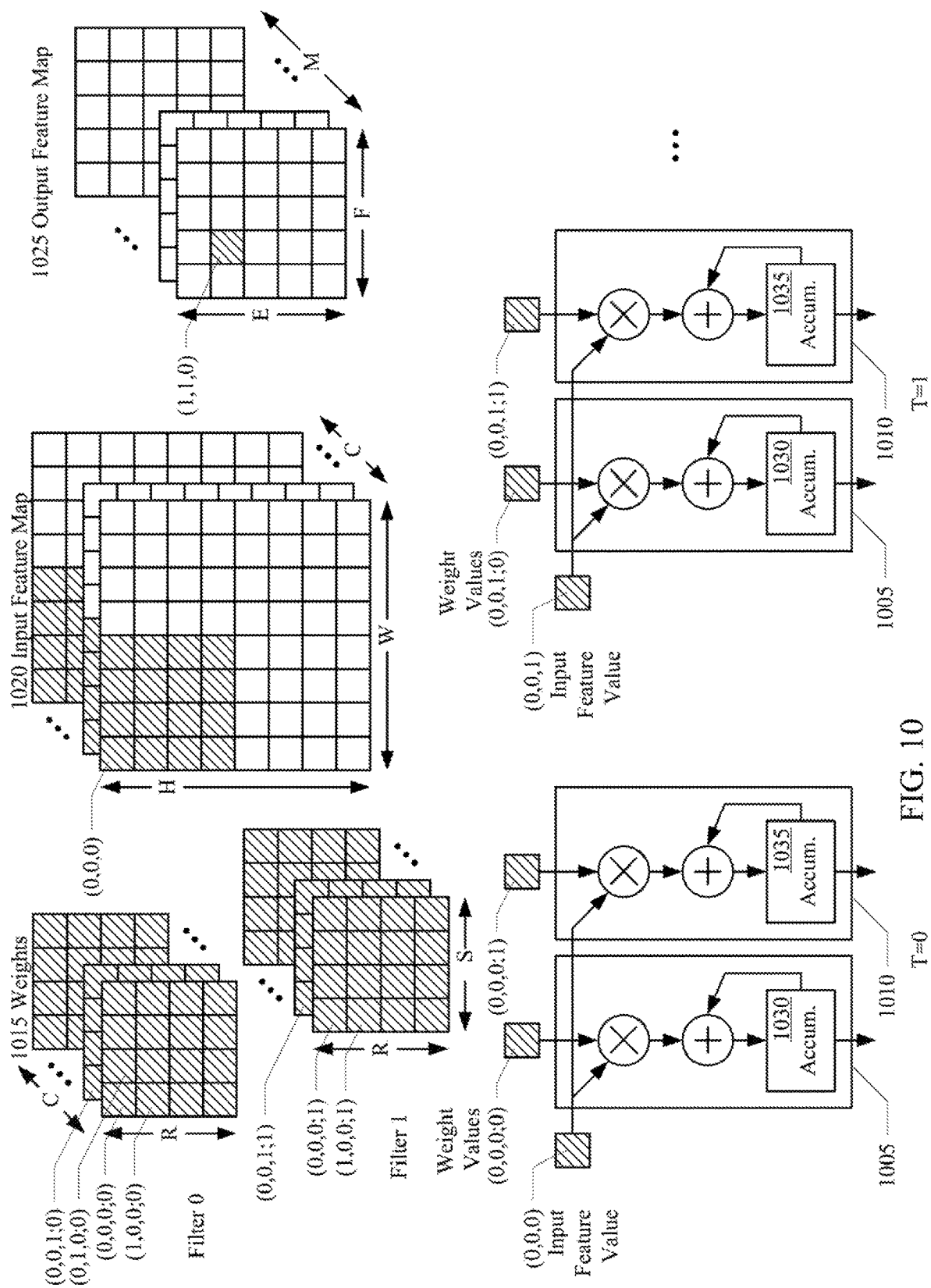
FIG. 10 shows exemplary multiply and accumulate operations used in the computation of the convolution, in accordance with aspects of the present technology.
Figure 11:
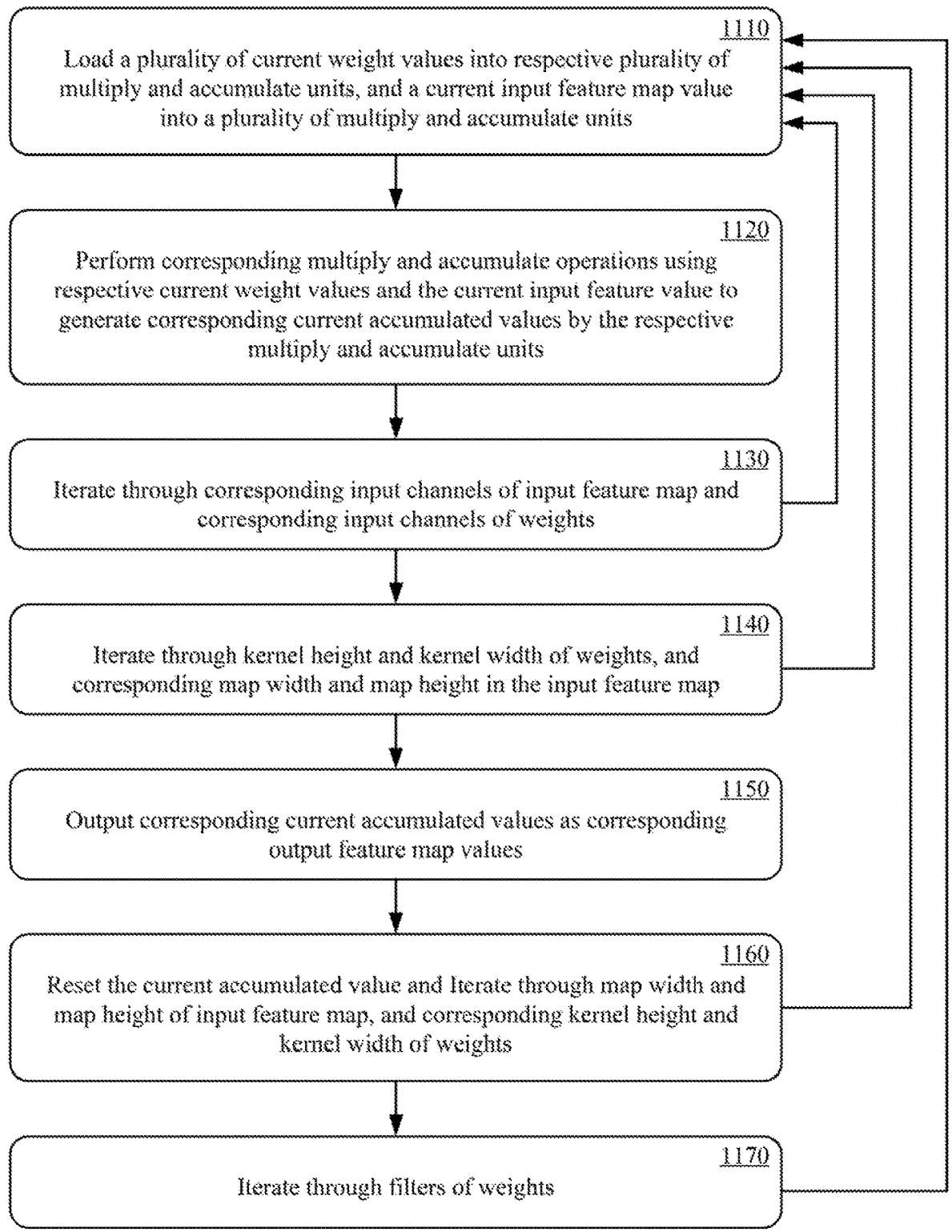
FIG. 11 shows a method of computing a convolution, in accordance with aspects of the present technology.

Referring now to FIGS. 10 and 11, the data reuse can include reading a current value of the input feature map in from memory to a plurality of multiply and accumulate units, in accordance with aspects of the present technology, is shown. As illustrated in FIG. 10, the processor can include a plurality of multiply and accumulate units 1005, 1010. The plurality of multiply and accumulate units 1005, 1010 can be configured to receive a current weight value from adjacent filters of a first matrix read in from a memory. The plurality of multiply an accumulate units 1005, 1010 can also be configured to receive a current input feature map value from a second matrix. In one implementation, the first matrix can be a weight matrix 1015 and the second matrix can be an input feature map 1020, as previously described with reference to FIG. 1. In such case the third matrix generated by the convolution of the weight matrix 1015 and the input feature map 1020 can be an output feature map 1025. Each multiply and accumulate unit 1005, 1010 can multiply the respective current data values in the weight matrix 1015 with the current data value in the input feature map 1020 and sum the product with the content of the respective accumulator buffers 1030, 1035 in the multiply and accumulate units 1005, 1010 to generate data values in the output feature map 1025.

Operation of the plurality of multiply and accumulate units will be further described with reference to FIG. 11. The operation can begin with loading current weight values of a plurality of filters (0,0,0;0) (0,0,0;1) and a current input feature map value (0,0,0) from memory into respective multiply and accumulate units 1005, 1010, at 1110. For example, a first weight value (0,0,0;0) can be loaded from a first memory into a first multiply and accumulate unit 1005, a second weight value (0,0,0;1) can be loaded into a second multiply and accumulate unit 1010, and a current input feature map value (0,0,0) can be loaded from a second memory into both multiply and accumulate units 1005, 1010, during a first cycle (T=0). Although FIG. 10 illustrates two multiply and accumulate units 1005, 1010, aspects of the present technology can be extended to more multiply and accumulate units.

At 1120, corresponding multiply and accumulate operations can be performed using respective current weight values and the current input feature map value to generate corresponding current accumulated values by the respective multiply and accumulate units 1005, 1010 during the first cycle (T=0). Therefore, during the first cycle (T=0), the current input feature value is reused in the plurality of multiply and accumulate units 1005, 1010. For example, a first multiply and accumulate unit 1005 can accumulate the product of the first weight value in the first filter (0,0,0;0) and the input feature map value (0,0,0), and the second multiply and accumulate unit 1010 can accumulate the product of the first weight value in the second filter (0,0,0; 1) and the input feature map value (0,0,0) during the first cycle. The input feature map value (0,0,0) is loaded once from memory and used by the first multiply and accumulate unit 1005, and also "reused" by the second multiply and accumulate unit 1010 without the need to reload the value from memory.

At 1130, the operations at 1110 and 1120 can be iterated through corresponding input channels of the input feature map and corresponding input channels of the weights. At 1140, the operations at 1110-1130 can be iterated through the kernel height and kernel width of the weights, and the corresponding map width and map height in the input feature map. For example, at a second cycle (T=1), a third weight value (0,0,1;0) and a fourth weight value (0,0,1; 1) can be loaded from memory and a second input feature map value (0,0,1) can be loaded from memory. The product of corresponding current weight values of adjacent filters and the current input feature map values can be added to the respective accumulated values from the first cycle.

After iterating through the kernel height and kernel width of the weights and corresponding map width and map height in the input feature map, the corresponding current accumulated values from the respective multiply and accumulate units 1005, 1010 can be output as corresponding output feature map values, at 1150. For example, at cycle R×C×S, the accumulated value of the first multiply and accumulate unit 1005 can be output as a corresponding output feature map value (1,1,0), and the accumulated value in the second multiply and accumulate unit 1010 can be output as a corresponding output feature map value (1,2,0) in a first output channel of the output feature map.

At 1160, the current accumulated values in the respective multiply and accumulate units 1005, 1010 can be reset, and the operations at 1110-1150 can be iterated through the map width and map height of the input feature map and the corresponding kernel height and kernel width of the weights. At 1170, the operations at 1110-1160 can be iterated through the filters of the weights to generate the complete output feature map 1025.

Figure 12:
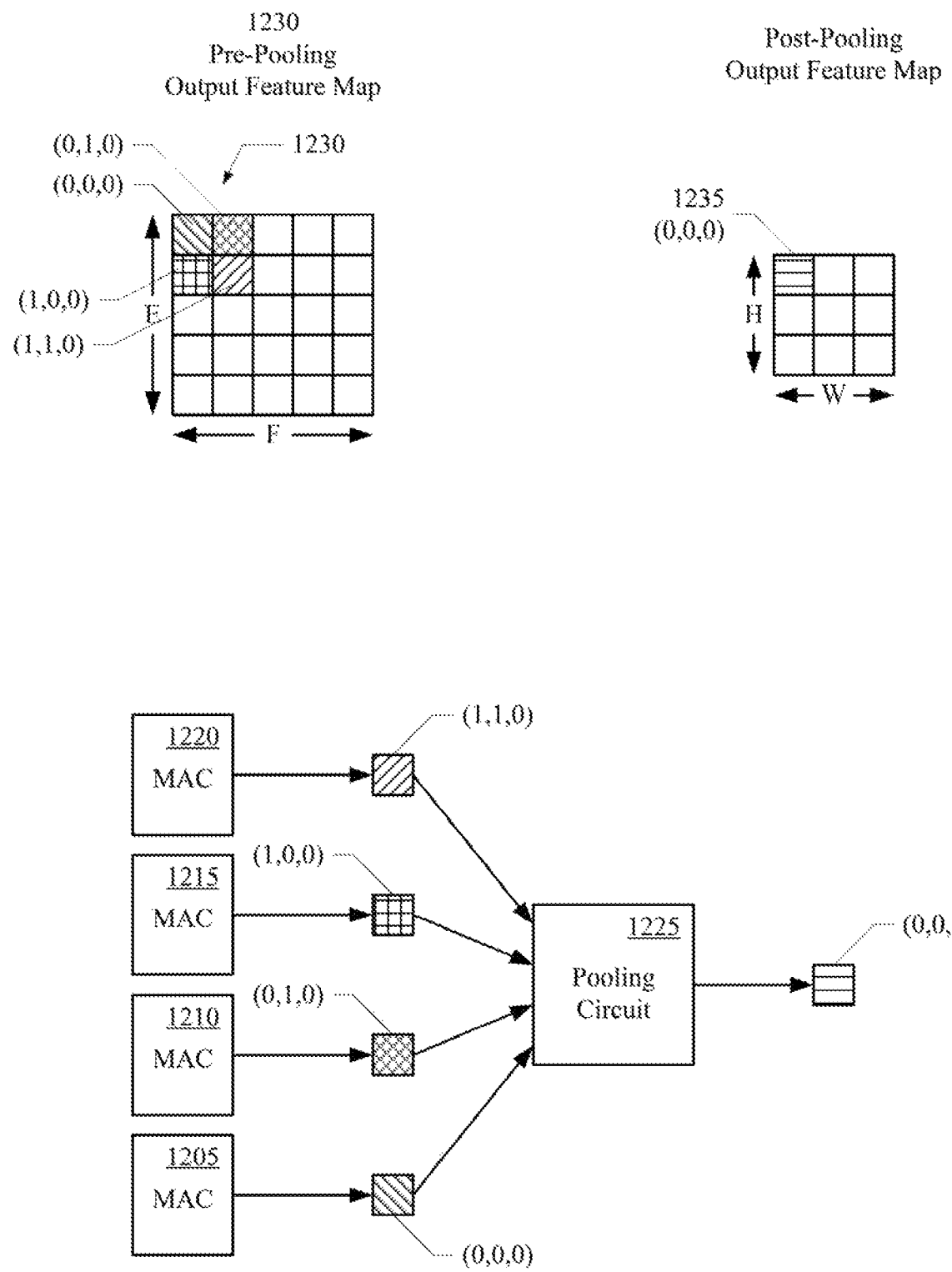
FIG. 12 shows a system for computing matrix convolutions including output feature map pooling, in accordance with aspects of the present technology.

Referring now to FIG. 12, a system for computing matrix convolutions including output feature map pooling, in accordance with aspects of the present technology, is shown. The system can include a plurality of multiply and accumulate units 1205-1220 as described above with regard to FIGS. 5-11. The plurality of multiply and accumulate units 1205-1220 can be configured for data reuse including reading a current value of the first matrix in from memory to the plurality of multiply and accumulate units, for data reuse including reading a current value of the second matrix in from memory to a serial shift buffer coupled to a plurality of multiply and accumulate units for data reuse including reading a current value of the input feature map in from memory to the plurality of multiply and accumulate units, or combinations thereof. The system can further include a pooling circuit coupled to the plurality of multiply and accumulate units 1205-1220. The pooling circuit 1225 can be configured to pool a plurality of adjacent output feature map values 1230 to generate a corresponding pooled output feature map value of a post-pooling output feature map 1235. For example, the pooling circuit 1225 can be a max pooling circuit configured to receive a plurality of output feature map values (0,0,0), (0,1,0), (1,0,0), (1,1,0) from a respective plurality of multiply and accumulate units 1205-1220, and select the maximum value of the plurality of output feature map values (0,0,0), (0,1,0), (1,0,0), (1,1,0) for output as a max-pool output feature map value (0,0,0) of the post-pooling output feature map 1235.

Data reuse by multiply and accumulate units in accordance with embodiments of the present technology can advantageously reduce bandwidth utilization on the communication channels between the memory and processing units of a computing system. The data reuse embodiments can also advantageously reduce power consumption by the memory devices and or processing units. The memory accesses can be shared between a plurality of multiply and accumulate units, which permits many computations to be done in parallel for each access to memory. Optionally, the data values can also advantageously be buffered in the processors for repeated use by the plurality of multiply and accumulate units. Pooling operations can also be advantageously performed before writing data back to memory.

The following examples pertain to specific technology embodiments and point out specific features, elements, or steps that may be used or otherwise combined in achieving such embodiments.

Example 1 includes a system comprising: one or more memories configured to store a first matrix and a second matrix; and one or more processors configured to perform a convolution of the first matrix and the second matrix to generate a third matrix using a plurality of multiply and accumulate units with data reuse of adjacent values in one or both of the first matrix and second matrix by respective ones of the plurality of multiply and accumulate units.

Example 2 includes the system according to Example 1, wherein a current value of the first matrix is loaded in from the one or more memories to the plurality of multiply and accumulate units.

Example 3 includes the system according to Example 2, further comprising: a serial shift buffer including a plurality of subsets of buffer elements, wherein respective subsets of the buffer elements are coupled to respective multiply and accumulate units; and wherein a value of the second matrix is loaded in from the one or more memories to the serial shift buffer.

Example 4 includes the system according to Example 1, wherein a current value in the second matrix is loaded in from the one or more memories to the plurality of multiply and accumulate units.

Example 5 includes the system according to Example 1, wherein: the first matrix comprises a plurality of weight filters, each weight filter including a plurality of weight input channels, each weight input channel characterized by a weight kernel height and a weight kernel width; the second matrix comprises a plurality of input feature map input channels, each input feature map input channel characterized by an input feature map height and an input feature map width; and the third matrix comprises a plurality of output feature map output channels, each output feature map output channel characterized by an output feature map height and an output feature map width.

Example 6 includes the system according to Example 5, wherein the one or more memories include: a static random access memory (SRAM), resistive random access memory (RRAM), magnetic random access memory (MRAM), phase change random access memory (PCRAM), or flash memory configured to store the plurality of weight filters; and a static random access memory (SRAM), resistive random access memory (RRAM), magnetic random access memory (MRAM), phase change random access memory (PCRAM), or flash memory configured to store the plurality of input feature map input channels.

Example 7 includes the system according to Example 6, wherein: the plurality of input feature map input channels comprise a plurality of image pixel values.

Example 8 includes the system according to Example 1, further comprising one or more pooling circuits coupled to the plurality of multiply and accumulate units, wherein the one or more pooling circuits are configured to pool a plurality of corresponding values from the plurality of multiply and accumulate units to generate a corresponding pooled value.

Example 9 includes a method comprising: loading values of a first matrix and values of a second matrix in from one or more memory devices; and performing multiply and accumulate operations in a plurality of multiply and accumulate units on corresponding values of the first matrix and values of the second matrix, with data reuse of adjacent values in one or both of the first matrix and second matrix by respective ones of the plurality of multiply and accumulate units, to generate a third matrix.

Example 10 includes the method of Example 9, wherein: the first matrix comprises a plurality of weight filters, each weight filter including a plurality of weight input channels, each weight input channel characterized by a weight kernel height and a weight kernel width; and the second matrix comprises an input feature map including a plurality of input feature map input channels, each input feature map input channel characterized by an input feature map height and an input feature map width.

Example 11 includes the method of Example 10, wherein a current value of the weight filters is loaded in from the one or more memory devices to the plurality of multiply and accumulate units.

Example 12 includes the method of Example 11, further comprising: loading a current weight value from the one or more memory devices into a plurality of multiply and accumulate units, and a plurality of adjacent current input feature map values from the one or more memory devices into respective multiply and accumulate units: performing corresponding multiply and accumulate operations using the current weight value and corresponding ones of the plurality current input feature map values to generate corresponding current accumulated values by the respective multiply and accumulate units; iterating through corresponding input channels of input feature map and corresponding input channels of weights; iterating through kernel height and kernel width of weights, and corresponding map width and map height in the input feature map; outputting corresponding current accumulated values as corresponding output feature map values; resetting the corresponding current accumulated values and iterating through map width and map height of input feature map, and corresponding kernel height and kernel width of weights; and iterating through filters of weights.

Example 13 includes the method of Example 11, further comprising: shifting values in the input feature map through a serial shift buffer; and a plurality of values in the input feature map are input from corresponding shift elements of the serial shift buffer to corresponding ones of the plurality of multiply and accumulate units.

Example 14 includes the method of Example 13, further comprising: loading associated input feature map values into a serial shift buffer, a current weight value into a plurality of multiply and accumulate units, and a plurality of current input feature map values from respective subsets of buffer elements of the serial shift buffer into respective multiply and accumulate units; performing corresponding multiply and accumulate operations using the current weight value and corresponding ones of the plurality current input feature map values from respective subsets of the buffer elements of the serial shift buffer to generate corresponding current accumulated values by the respective multiply and accumulate units; iterating through corresponding input channels of input feature map and corresponding input channels of weights; iterating through kernel height and kernel width of weights, and corresponding map width and map height in the input feature map; outputting corresponding current accumulated values as corresponding output feature map values; resetting the corresponding current accumulated values and iterating through map width and map height of input feature map, and corresponding kernel height and kernel width of weights; and iterating through filters of weights.

Example 15 includes the method of Example 10, wherein a current value of the input feature map is loaded in from the one or more memory devices to the plurality of multiply and accumulate units.

Example 16 includes the method of Example 15, further comprising: loading a plurality of current weight values into respective plurality of multiply and accumulate units, and a current input feature map value into a plurality of multiply and accumulate units; performing corresponding multiply and accumulate operations using respective current weight values and the current input feature map value to generate corresponding current accumulated values by the respective multiply and accumulate units; iterating through corresponding input channels of input feature map and corresponding input channels of weights; iterating through kernel height and kernel width of weights, and corresponding map width and map height in the input feature map; outputting corresponding current accumulated values as corresponding output feature map values; resetting the corresponding current accumulated values and iterating through map width and map height of input feature map, and corresponding kernel height and kernel width of weights; and iterating through filters of weight.

Example 17 includes the method according to Example 10, wherein the input feature map comprises a plurality of image pixel data.

Example 18 includes the method according to Example 9, further comprising: loading values output from the plurality of multiply and accumulate units out to the one or more memory devices as corresponding values of a third matrix.

Example 19 includes the method according to Example 9, further comprising: pooling values output from the plurality of multiply and accumulate units; and loading the pooled values out to the one or more memory devices as corresponding values of a pooled third matrix.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A system comprising:
   one or more memories configured to store a first matrix and a second matrix, wherein the first matrix includes a plurality of channels each of a first height and a first width and the second matrix includes a plurality of channels each of a second height and a second width; and
   a plurality of multiply and accumulate units configured to perform a convolution of the first matrix and the second matrix to generate a third matrix;
   a serial shift buffer including a plurality of subsets of buffer elements, wherein respective subsets of the buffer elements are coupled to respective ones of the multiply and accumulate units, and wherein respective subsets of buffer elements include a first row of buffer elements and a second row of buffer elements, wherein a last buffer element of the first row is directly coupled to a first buffer element of the second row; and
   wherein for a compute window values for the plurality of channels of the first matrix are loaded in from the one or more memories to respective subsets of the multiply and accumulate units, wherein for the compute window a plurality of adjacent values of the second matrix are loaded in from respective subsets of buffer elements to the respective subsets of the multiply and accumulate units, wherein adjacent values of the second matrix are loaded from respective subset of buffer elements to another respective subset of buffer elements, and wherein current values of a channel of the third matrix for the compute window are concurrently computed from a current value of the first matrix loaded in the subset of the multiply and accumulate units and respective current values of the second matrix within and across the plurality of channels loaded in respective ones of the subset of multiply and accumulate units.

2. The system according to claim 1, wherein:
the first matrix comprises a plurality of weight filters, each weight filter including a plurality of weight input channels, each weight input channel characterized by a weight kernel height and a weight kernel width;
the second matrix comprises a plurality of input feature map input channels, each input feature map input channel characterized by an input feature map height and an input feature map width; and
the third matrix comprises a plurality of output feature map output channels, each output feature map output channel characterized by an output feature map height and an output feature map width.

3. The system according to claim 2, wherein the one or more memories include:
a static random access memory (SRAM), resistive random access memory (RRAM), magnetic random access memory (MRAM), phase change random access memory (PCRAM), or flash memory configured to store the plurality of weight filters; and
a static random access memory (SRAM), resistive random access memory (RRAM), magnetic random access memory (MRAM), phase change random access memory (PCRAM), or flash memory configured to store the plurality of input feature map input channels.

4. The system according to claim 3, wherein:
the plurality of input feature map input channels comprise a plurality of image pixel values.

5. The system according to claim 1, further comprising one or more pooling circuits coupled to the plurality of multiply and accumulate units, wherein the one or more pooling circuits are configured to pool a plurality of corresponding values from the plurality of multiply and accumulate units to generate a corresponding pooled value.

6. A method comprising:
loading values of a first matrix and values of a second matrix in from one or more memory devices, wherein the first matrix includes a plurality of channels each of a first height and a first width and the second matrix includes a plurality of channels each of a second height and a second width; and
performing multiply and accumulate operations concurrently in the plurality of multiply and accumulate units utilizing a compute window on corresponding values of the first matrix and values of the second matrix with data reuse of adjacent values by performing corresponding multiply and accumulate operations using the current weight value and corresponding ones of the plurality current input feature map values from respective subsets of the buffer elements of a serial shift buffer and loading adjacent values of the second matrix from respective subsets of buffer elements to other respective subsets of buffer elements across the plurality of channels of the first matrix and the second matrix by respective ones of the plurality of multiply and accumulate units, to generate a third matrix, wherein the respective subsets of buffer elements for the second matrix includes rows of elements, wherein a last element of a first row is directly coupled to a first element of a second row.

7. The method of claim 6, wherein:
the first matrix comprises a plurality of weight filters, each weight filter including a plurality of weight input channels, each weight input channel characterized by a weight kernel height and a weight kernel width; and
the second matrix comprises an input feature map including a plurality of input feature map input channels, each input feature map input channel characterized by an input feature map height and an input feature map width.

8. The method of claim 7, further comprising:
iterating through corresponding input channels of input feature map and corresponding input channels of weights;
iterating through kernel height and kernel width of weights, and corresponding map width and map height in the input feature map;
outputting corresponding current accumulated values as corresponding output feature map values;
resetting the corresponding current accumulated values and iterating through map width and map height of input feature map, and corresponding kernel height and kernel width of weights; and
iterating through filters of weights.

9. The method according to claim 7, wherein the input feature map comprises a plurality of image pixel data.

10. The method according to claim 6, further comprising:
loading values output from the plurality of multiply and accumulate units out to the one or more memory devices as corresponding values of a third matrix.

11. The method according to claim 6, further comprising:
pooling values output from the plurality of multiply and accumulate units; and
loading the pooled values out to the one or more memory devices as corresponding values of a pooled third matrix.

12. A system comprising:
one or more memories configured to store a first matrix and a second matrix, wherein the first matrix includes a plurality of channels each of a first height and a first width and the second matrix includes a plurality of channels each of a second height and a second width; and
a plurality of multiply and accumulate units configured to perform a convolution utilizing a compute window on the first matrix and the second matrix to generate a third matrix utilizing concurrent data reuse in the compute window across the plurality of channels of the first matrix and a plurality of adjacent values of the second matrix, wherein adjacent values of the second matrix are loaded from respective subsets of buffer elements, wherein subsets of buffer elements include rows of elements, wherein a last buffer element of a first row is directly coupled to a first buffer element of a second row, and wherein the adjacent value from respective subsets of buffer elements are loaded to another respective subset of buffer elements for concurrent data reuse.

13. The system according to claim 12, wherein the number of the plurality of multiply and accumulate units is based on a size of the compute window.

14. The system according to claim 12, herein the first matrix further includes a plurality of filters each including the plurality of channels.

15. The system according to claim 14, wherein the plurality of multiply and accumulate units are further configured to perform the convolution utilizing the compute window on the first matrix and second matrix to generate the third matrix across the plurality of filter of the first matrix.

* * * * *